L. A. WATSON.
SYSTEM OF ELECTRICAL DISTRIBUTION.
APPLICATION FILED SEPT. 19, 1919.
1,389,332.
Patented Aug. 30, 1921.
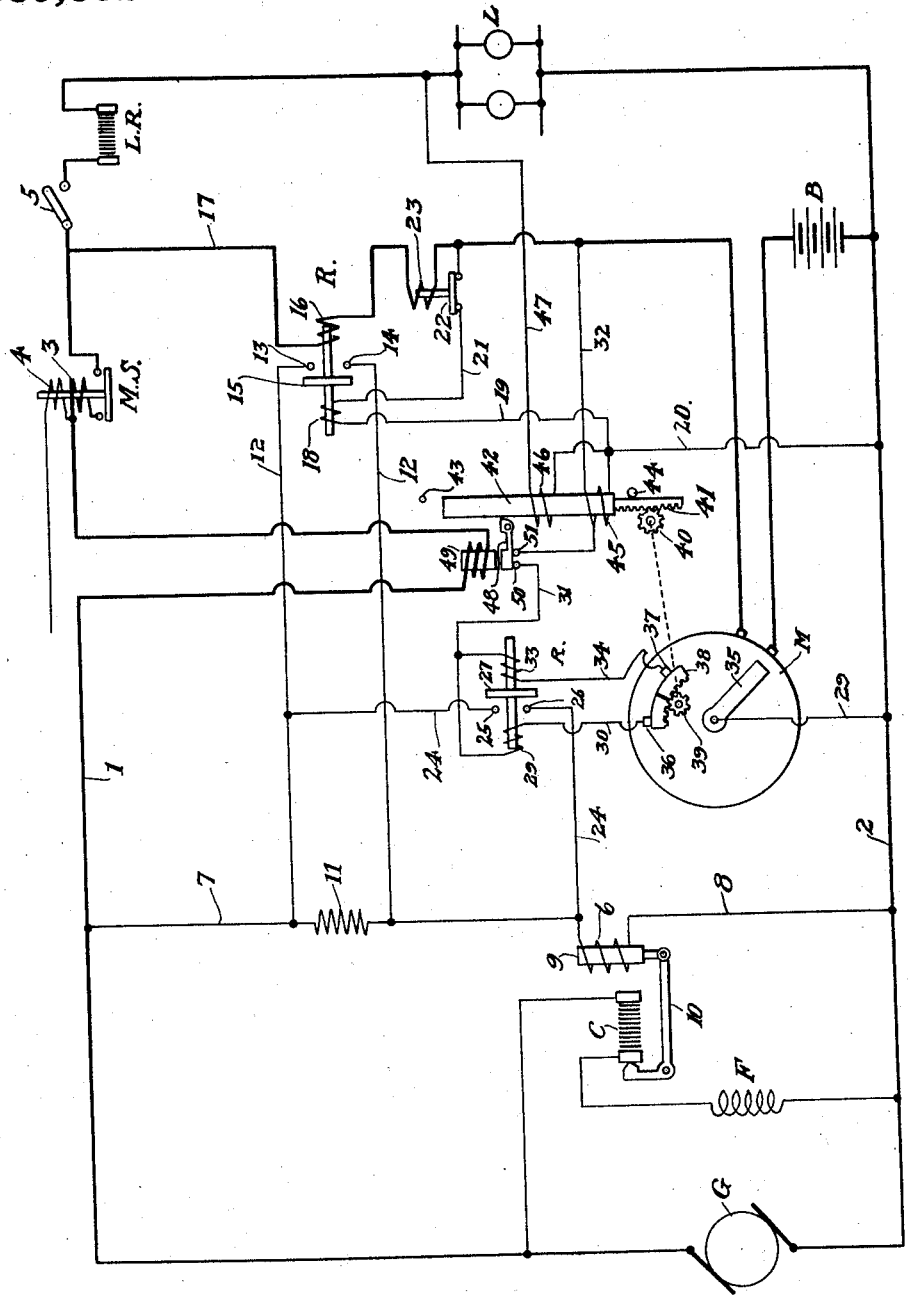

UNITED STATES PATENT OFFICE.

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,332.  Specification of Letters Patent.  Patented Aug. 30, 1921.

Application filed September 19, 1919. Serial No. 325,006.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and more particularly to an improved car lighting system wherein a variable speed generator is employed to charge a storage battery, and lamps are provided for supply by the generator or by the battery and wherein automatic regulating apparatus is utilized to control the generator in accordance with the needs of the system.

It is an object of the invention to provide an improved system of the character mentioned wherein the generator may be controlled exclusively by a voltage-responsive regulator tending when effective to maintain relative constancy of generator voltage as against speed changes and as against load changes and at a value of voltage properly suited to the requirements of the battery.

A further object of the invention is to provide an improved regulating apparatus for a variable speed generator associated to charge a storage battery and wherewith the generator voltage is held at a reduced value during the early stages of battery charge, is raised to a higher value during an extended final period of charge, and is again held to the lower value at a time after the completion of charge.

Other objects and advantages will be in part noted hereinafter in connection with the following description of the accompanying drawing, which illustrates a typical embodiment of the invention and which represents a schematic view of the elements of the system and a diagram of their electrical connections.

As shown, there is provided an axle-driven variable speed generator G having a shunt field winding F, which latter includes a variable regulating resistance, such as a carbon pile C. The generator is adapted for connection by mains 1 and 2 to charge a storage battery B and supply lamps L. A well-known form of main switch MS is provided to control the continuity of line 1 and is governed by current coil 3 and voltage coil 4 designed to allow the switch to open when and while the generator voltage is below a predetermined value and to close the switch when the generator voltage is above a predetermined value. Likewise a manual switch 5 is provided to control circuit to the lamps and a regulator LR including a variable resistance is present to limit the voltage applied to the lamps when the latter are supplied by the generator or by the battery.

The strength of the field winding F is automatically governed for regulation of the generator output by a voltage responsive coil 6 connected across the mains 1 and 2 by leads 7 and 8 and acting on a movable core 9 attached to bell crank lever 10 to vary the degree of compression of the carbon pile C in a manner tending to maintain relative constancy of generator voltage as against driven speed changes of the generator, and as against changes in the counter E. M. F. of the battery and changes in the load of the lamps L. The relative effectiveness of the coil 6 is established by a resistance 11 adapted, under certain conditions, to be included in series with the coil in line 7, and under other conditions to be excluded from the circuit of said coil. More specifically, the resistance 11 is controlled by an automatic device responsive to the instant amount of charging current in a manner whereby the resistance is short-circuited and the voltage of the generator thereby depressed upon the occurrence of an excessive charging current and is controlled to the same end by an automatic device at a time toward the end of charging determined by the condition of the battery and by a predetermined diminishment of the generator voltage.

As shown, the resistance 11 is provided with a shunt 12 including contacts 13, 14 adapted to be bridged or broken by the switch element 15 of a relay R. The relay in turn includes an actuating coil 16 in series in battery branch 17 and designed to respond as an overload coil to actuate the switch element 15 to bridge contacts 13, 14 when, for example, the charging current exceeds a pre-selected value, such as sixty amperes. The relay is also provided with an opposite coil 18 adapted for connection by lines 19, 20 and 21 across the battery B. Line 21 includes contacts adapted to be bridged or broken by a switch element 22, in turn governed by a current coil 23 also in series with the battery branch 17 but designed as an underload coil to drop the switch 22 and close the break in line 21 when, for example, the charging current passes below a predetermined amount, such as twenty amperes.

The resistance 11 is further provided with a second shunt 24 thereabout including contacts 25 and 26 which are adapted to be bridged or broken by a switch element 27 of a second relay R' under certain conditions to be stated. The relay R' includes an actuating voltage coil 28 adapted for connection by lines 29, 30 and 31, 32 across the battery so that, when the circuit of said coil is completed, the switch element 27 is moved to complete the short circuit 24 about resistance 11. The relay R' also has an oppositely acting coil 33 adapted for connection by lines 29, 34 and 31, 32 across the battery to cause the switch element 27 to break the circuit across contacts 25 and 26.

An ampere hour meter M is provided in the battery branch 17 to indicate the state of battery charge by measurement of the charging and discharging current, and includes a movable center contact 35 rotatable counterclockwise on charge and clockwise on discharge and connected by line 29 to the generator main 2. The meter is also provided with a terminal contact 36 and an adjacent contact 37 insulated from each other, but preferably mounted on a segment gear 38 meshing with a pinion 39 connected mechanically with a pinion 40, in turn meshing with a rack 41 on a movable core 42. The position of core 42 between an upper stop 43 and a lower stop 44 is established under conditions to be stated, by a voltage coil 45 connected across the battery by lines 20 and 32 (and responsive to battery voltage on open circuit), and a voltage coil 46 connected by lines 20 and 47 across the lamps (and responsive to lamp voltage.) Coils 45 and 46 are designed to balance the core 42 at a position dependent on the voltage of the battery as distinct from generator voltage, and to accomplish this end there is provided a lock, such as a pivoted lever 48 having its end adjacent the pivot positioned to wedge against core 42 and restrain movement of the latter at all times while the voltage of the generator is impressed on the battery. Lever 48 may be moved to lock 42 during the period of energization of a magnet including a winding 49 in the line 1 on the generator side of the main switch MS, and the lever will automatically drop to free the core 42 for movement upon a predetermined diminishment of the generator voltage, typically sufficient to cause an opening of the switch MS. It will thus be apparent that coil 45 (or coils 45 and 46) is rendered effective to position the meter contacts 36 and 37 only during an interval of regulating ineffectiveness of the voltage coil 6 and, during such period, acts to establish the time in the charging of the battery at which the meter contact 35 engages terminal contact 36 to close the break at the meter across lines 29 and 30.

The circuits of coils 28 and 32 of relay R' are subject to control for energization to an automatic means responsive to a predetermined diminishment of the generator voltage. This automatic means, as shown, may include the lever 48 and winding 49, the lever being arranged to complete a break across contacts 50 and 51 in line 31 when the lever drops in response to the diminishment of current in winding 49, caused by a diminishment of the generator voltage sufficient to open the switch MS at, for example, train deceleration or stoppage.

The functional working of the system as described may be briefly explained as follows: Assuming the train at rest and the switch MS open, the underload coil 23 allows the switch element 22 to drop and complete the energization of coil 18 of relay R to break the shunt 12 about resistance 11. When the train starts, therefore, regulating coil 6 will be weakened by the inclusion of resistance 11 and the building up of the generator voltage expedited to effect a quick reclosure of the switch MS for the resumption of charging current. If, now, the counter E. M. F. of the battery is so low so that the then higher level of generator voltage constancy as maintained by the regulating coil 6 causes an excessive current inrush to the battery, coil 16 of relay R becomes energized to attract switch element 15 and complete the short circuit 12 about resistance 11, whereby the generator voltage is reduced to a value consistent with the then condition of the battery. Assuming the charge to continue at this rate, say by generator voltage of thirty-five, the charging current will gradually taper until the underload coil 23 allows switch element 22 to drop and energize coil 18 of relay R for excluding the resistance 11 from the circuit of coil 6 and raising the generator voltage to say forty volts. The charging thus continues until a time dependent on the position of the terminal contact 36 of meter M as established by the coils 45 and 46 at a moment of regulating ineffectiveness of the coil 6, and dependent on the next succeeding diminishment of generator voltage, due, for example, to a train stop. Lever 48 is released under the last-mentioned condition to close the break across contacts 50 and 51 and coil 28 of relay R' thereby is energized to close the break across contacts 25 and 26 in the other short circuit 24 about resistance 11 and the regulator set to maintain relative constancy of generator voltage during the succeeding period at the lower value of say thirty-five volts, for terminating charging current to the battery. On discharge of the battery it will be apparent that when meter contact 25 engages contact 37, coil 33 of the relay R' will be energized to cause switch element 27 of relay R' to break the short circuit 24 about resistance 11 and thereby place the regulator in condition to maintain the generator voltage constancy at its higher value to expedite the re-completion of charging, when the generator again becomes active.

It will be noted that relay R acts automatically to affect the regulating coil 6 in a manner to maintain generator voltage at a higher or lower value, dependent on the condition of the battery as reflected in the counter E. M. F. opposition of the battery to the applied voltage, and that the shunt 24 about resistance 11 is governed automatically dependent on the condition of the battery as reflected in the battery voltage on open circuit or on discharge, and at a time dependent on a predetermined diminishment of the generator voltage next succeeding a substantial completion of the battery charge. It will be further noted that the single voltage coil 6 of the generator regulator is sufficient at all times and is set automatically to meet the requirements of the system for protection of the battery against over-charging, for protection of the system at the beginning of charge, and for the regulation of the generator as against speed and load changes.

Having described my invention, what I claim as new and desire to secure by Letters Patent is:

1. In combination, a variable speed generator, a storage battery adapted for connection to be charged thereby, a regulator for said generator including a voltage-responsive coil tending when effective to maintain relative constancy of generator voltage as against speed changes and as against gradual changes in counter E. M. F. of the battery, automatic means influenced by the amount of charging current for affecting said regulator under certain conditions to determine the effectiveness of said coil, and means to affect said regulator at a time after substantial battery charging to determine the effectiveness of said coil.

2. In combination, a variable speed generator, a storage battery adapted for connection to be charged thereby, a regulator for said generator including a voltage-responsive coil tending when effective to maintain relative constancy of generator voltage as against speed changes and as against gradual changes in counter E. M. F. of the battery, automatic means influenced by the amount of charging current for affecting said regulator under certain conditions to determine the effectiveness of said coil, and means to affect said regulator at a time after substantial battery charging to determine the effectiveness of said coil dependent on the voltage of said battery and on a predetermined diminishment of generator voltage.

3. In combination, a variable speed generator, a battery adapted for connection to be charged thereby, a regulator for said generator comprising a voltage-responsive coil connected across the generator mains and tending when effective to maintain relative constancy of generator voltage as against speed changes, a resistance adapted for inclusion in the circuit of said coil under certain conditions and for exclusion from said circuit under other conditions, and means to exclude said resistance from the circuit of said coil during a period of depressed battery counter E. M. F. and to again exclude said resistance from said circuit upon a predetermined diminishment of generator voltage next succeeding a substantial completion of battery charging.

4. In combination, a variable speed generator, a battery adapted for connection to be charged thereby, a regulator for said generator including a voltage-responsive coil tending when effective to maintain relative constancy of generator voltage as against speed changes and as against load changes, a resistance adapted for inclusion in the circuit of said coil under certain conditions and for exclusion from said circuit under other conditions, means responsive to the quantity of charging current to exclude said resistance during periods of depressed battery voltage and to include said resistance during periods of increased battery voltage, and additional means to again exclude said resistance from the circuit of said coil at a time in the charging of said battery dependent on the voltage of the latter.

5. In combination, a variable speed generator, a battery adapted for connection to be charged thereby, a regulator for said generator including a voltage-responsive coil tending when effective to maintain relative constancy of generator voltage as against speed changes and as against gradual changes in the counter E. M. F. of said battery, a resistance adapted for inclusion in the circuit of said coil under certain conditions and for exclusion from said circuit under other conditions, automatic electro-responsive means to exclude said resistance from said circuit at the beginning of charge and to include said resistance in said circuit during a final period of charge, and additional means to re-exclude said resistance from said circuit upon a predetermined diminishment of the generator voltage next succeeding the substantial completion of battery charging.

6. In combination, a variable speed generator, a storage battery adapted for connection to be charged thereby, a regulator for said generator including a voltage-responsive coil, a resistance adapted to be included in the circuit of said coil under certain conditions and to be excluded from said circuit under other conditions, a relay responsive to charging current in excess of a predetermined amount to exclude said resistance and responsive to charging current below a predetermined lower amount to reinclude said resistance, and electro-responsive means to exclude said resistance from the circuit of said coil after the substantial completion of battery charging.

7. In combination, a variable speed generator, a storage battery adapted for connection to be charged thereby, a regulator for said generator including a voltage-responsive coil, a resistance adapted to be included in the circuit of said coil under certain conditions and to be excluded from said circuit under other conditions, a relay responsive to charging current in excess of a predetermined amount to exclude said resistance and responsive to charging current below a predetermined lower amount to reinclude said resistance, and electro-responsive means independent of said relay to exclude said resistance from the circuit of said coil after the substantial completion of battery charging.

In testimony whereof I affix my signature, in the presence of two witnesses.

LEONARD A. WATSON.

Witnesses:
HELEN M. SEAMANS,
DAVID A. WOODCOCK.